(12) United States Patent
Wang

(10) Patent No.: US 10,602,822 B1
(45) Date of Patent: *Mar. 31, 2020

(54) LUGGAGE HAVING A BRAKEABLE WHEEL

(71) Applicant: Hsuen-Hsuan Wang, Miaoli (TW)

(72) Inventor: Hsuen-Hsuan Wang, Miaoli (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/211,343

(22) Filed: Dec. 6, 2018

(51) Int. Cl.
*A45C 13/26* (2006.01)
*A45C 5/14* (2006.01)
*B60B 33/00* (2006.01)

(52) U.S. Cl.
CPC ............. *A45C 13/262* (2013.01); *A45C 5/14* (2013.01); *B60B 33/0081* (2013.01); *B60B 33/0086* (2013.01); *B60B 33/0092* (2013.01); *A45C 2013/267* (2013.01); *Y10T 16/195* (2015.01)

(58) Field of Classification Search
CPC . A45C 13/262; A45C 13/28; A45C 2013/267; A45C 5/14; A45C 5/145; Y10T 16/195; Y10T 16/451; B60B 33/0081; B60B 33/0086; B60B 33/0092

See application file for complete search history.

(56) References Cited

U.S. PATENT DOCUMENTS

| | | | | |
|---|---|---|---|---|
| 5,242,035 A * | 9/1993 | Lange | ................... | B60B 33/021 16/35 R |
| 5,632,360 A * | 5/1997 | Melara | ................ | B60B 33/0042 16/35 R |
| 5,901,822 A * | 5/1999 | Tu | ............................. | A45C 5/14 16/113.1 |
| 6,286,183 B1 * | 9/2001 | Stickel | ..................... | A61G 7/05 16/30 |
| 6,286,630 B1 * | 9/2001 | Obergfell | .................. | B62B 5/04 188/1.12 |
| 6,298,950 B1 * | 10/2001 | Oelrichs | ............. | B60B 33/0018 188/1.12 |
| 6,345,414 B1 * | 2/2002 | Chen | ........................ | A45C 5/14 16/113.1 |
| 6,865,775 B2 * | 3/2005 | Ganance | .................. | A61G 7/00 16/35 R |
| 7,331,428 B2 * | 2/2008 | Chiang | ............... | B60B 33/0021 188/1.12 |
| 7,614,115 B2 * | 11/2009 | Yan | .......................... | A61G 7/05 16/18 R |
| 7,703,588 B2 * | 4/2010 | Chiang | .................. | A45C 5/145 16/35 R |
| 7,707,686 B2 * | 5/2010 | Chou | .................. | B60B 33/0002 16/35 R |

(Continued)

*Primary Examiner* — Jeffrey O'Brien
(74) *Attorney, Agent, or Firm* — Alan D. Kamrath; Karin L. Williams; Mayer & Williams PC

(57) ABSTRACT

A luggage includes a pull handle unit, a pressing unit mounted in the pull handle unit, a driving unit connected with the pressing unit, a transmission unit connected with the driving unit, and a wheel unit connected with the transmission unit. The pull handle unit includes an outer pipe and an inner pipe. The wheel unit includes a single wheel. When the inner pipe is moved downward in the outer pipe, the wheel is braked and cannot be moved anymore, and when the inner pipe is moved upward in the outer pipe, the wheel is unlocked and is moved freely. Thus, when the inner pipe is retracted into the outer pipe, the wheel is braked temporarily, such that the luggage is locked and cannot be moved when not in use.

10 Claims, 16 Drawing Sheets

(56) References Cited

U.S. PATENT DOCUMENTS

| | | | | |
|---|---|---|---|---|
| 7,866,453 B2* | 1/2011 | Wu | ............... | A45C 5/145 |
| | | | | 16/35 R |
| 8,051,533 B2* | 11/2011 | Block | ............ | B60B 33/0028 |
| | | | | 16/35 R |
| 8,205,297 B2* | 6/2012 | Fallshaw | ............ | B60B 33/0021 |
| | | | | 16/35 R |
| 8,522,397 B1* | 9/2013 | Tsai | ............ | B60B 33/0042 |
| | | | | 16/35 R |
| 8,714,314 B1* | 5/2014 | Chen | ............ | A45C 5/145 |
| | | | | 16/35 R |
| 8,806,714 B2* | 8/2014 | Eguchi | ............ | A45C 5/145 |
| | | | | 16/35 R |
| 9,049,908 B2* | 6/2015 | Jiang | ............ | A45C 5/145 |
| 9,216,754 B2* | 12/2015 | Chen | ............ | B62B 5/0447 |
| 9,603,764 B2* | 3/2017 | Turturro | ............ | A61G 7/05 |
| 9,862,229 B2* | 1/2018 | Hofrichter | ......... | B60B 33/0042 |
| 2007/0056141 A1* | 3/2007 | Armano | ............ | B60B 33/0021 |
| | | | | 16/35 R |
| 2011/0083298 A1* | 4/2011 | Yan | ............ | B60B 33/0021 |
| | | | | 16/31 R |
| 2012/0255141 A1* | 10/2012 | Lin | ............ | B60B 33/0081 |
| | | | | 16/45 |
| 2014/0000989 A1* | 1/2014 | Lai | ............ | A45C 5/145 |
| | | | | 188/69 |
| 2019/0307219 A1* | 10/2019 | Tan | ............ | A45C 13/262 |

* cited by examiner

LUGGAGE HAVING A BRAKEABLE WHEEL

BACKGROUND OF THE INVENTION

1. Field of the Invention

The present invention relates to a luggage (or luggage carrier) and, more particularly, to a luggage having a breakable wheel.

2. Description of the Related Art

A conventional luggage in accordance with the prior art shown in FIG. 1 comprises a luggage body 1, a pull handle unit 13 retractably mounted on the luggage body 1, a base 11 mounted on the bottom of the luggage body 1, and a wheel unit 12 mounted on the base 11. However, the conventional luggage is not provided with a braking mechanism to brake the wheel unit 12, such that the wheels of the wheel unit 12 are rolled freely. Thus, when the luggage body 1 is placed on an inclined surface when not in use, the luggage body 1 will easily slide or displace, such that the user has to hold the pull handle unit 13 constantly to prevent the luggage body 1 from moving freely, thereby greatly causing inconvenience to the user.

BRIEF SUMMARY OF THE INVENTION

The primary objective of the present invention is to provide a luggage with a single wheel that is braked by manipulation of a pull handle when not in use, such that the luggage will not slide when it is stationary and not dragged.

In accordance with the present invention, there is provided a luggage comprising a pull handle unit, a pressing unit mounted in the pull handle unit, a driving unit connected with the pressing unit, a transmission unit connected with the driving unit, and a wheel unit connected with the transmission unit. The pull handle unit includes an outer pipe and an inner pipe movably mounted in the outer pipe. The pressing unit includes a spring support secured in the outer pipe, a control box movably mounted in the outer pipe, and a first compression spring biased between the spring support and the control box. The driving unit includes a fixed seat secured on the outer pipe, and a drive member mounted on the fixed seat. The fixed seat is provided with a mounting groove. The drive member has a first neck and a second neck. The first neck of the drive member is mounted in the mounting groove of the fixed seat. The first neck has a first driving portion secured to the control box. The second neck has a second driving portion. The transmission unit includes a bottom plate, a support seat mounted on the bottom plate and provided with a receiving chamber, a transmission member mounted in the receiving chamber of the support seat, and having a first end driven by the second driving portion of the drive member, and a second end provided with a pressing portion, a second compression spring biased between the support seat and the pressing portion of the transmission member, and a top cover mounted on the bottom plate and covering the support seat. The bottom plate is mounted in a luggage body and secured on a bottom of the luggage body. The receiving chamber of the support seat has a side provided with a limit breach, and the second neck of the drive member is mounted in the limit breach of the support seat. The top cover is provided with a through hole, and the drive member passes the through hole of the top cover. The wheel unit includes a base secured to the bottom plate, a wheel support pivotally mounted on the base, a wheel mounted on the wheel support, a drive shaft movably mounted on the base, and having an upper end driven by the pressing portion of the transmission member, and a brake member mounted on a lower end of the drive shaft, and provided with a braking rim that is movable to press the wheel. The base is located outside of the luggage body and secured on the bottom of the luggage body. The base is provided with a shaft hole. The drive shaft extends through the shaft hole of the base. The second compression spring is mounted on the upper end of the drive shaft. The wheel support is provided with a shaft hole. The brake member is provided with a shaft hole. The lower end of the drive shaft extends through the shaft hole of the wheel support and the shaft hole of the brake member, such that the brake member is pivotally mounted on the drive shaft.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
FIG. 1 is a perspective view of a conventional luggage in accordance with the prior art.
Figure 2:
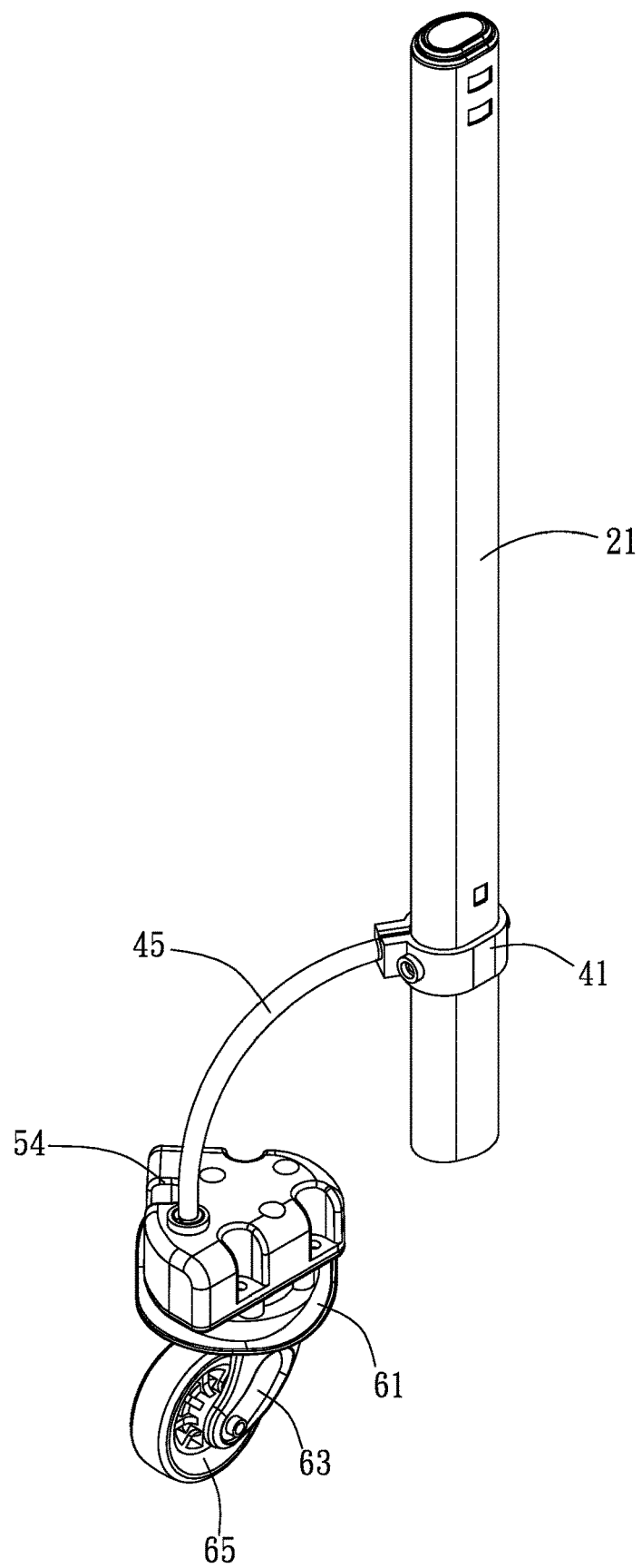
FIG. 2 is a partial perspective view of a luggage in accordance with the preferred embodiment of the present invention.
Figure 3:
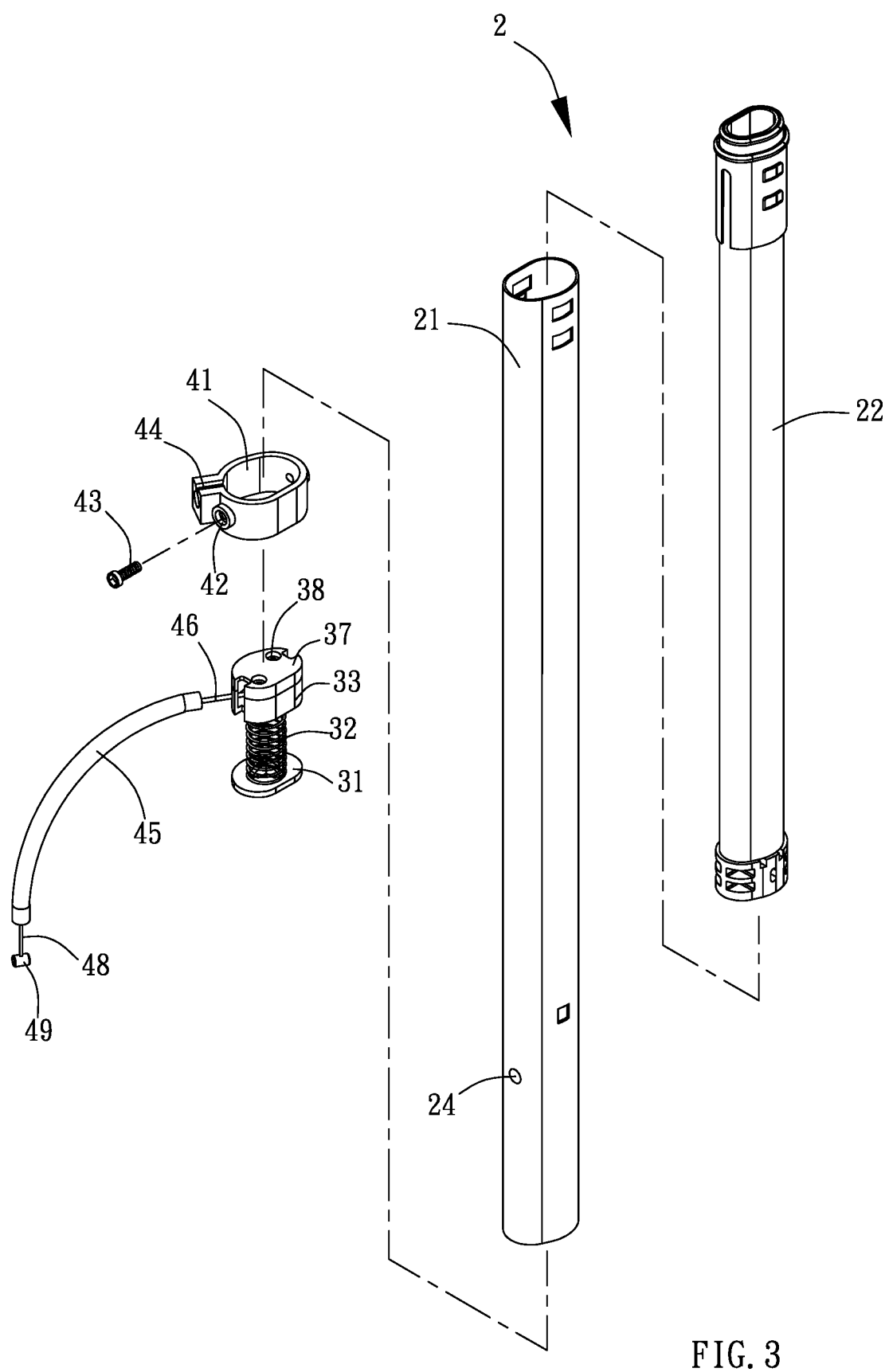
FIG. 3 is a partial exploded perspective view of the luggage in accordance with the preferred embodiment of the present invention.
Figure 4:
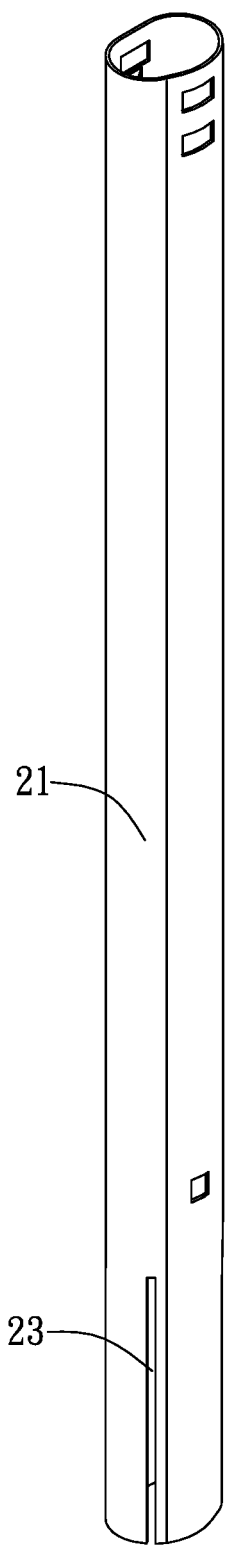
FIG. 4 is a perspective view of an outer pipe of the luggage in accordance with the preferred embodiment of the present invention.
Figure 5:
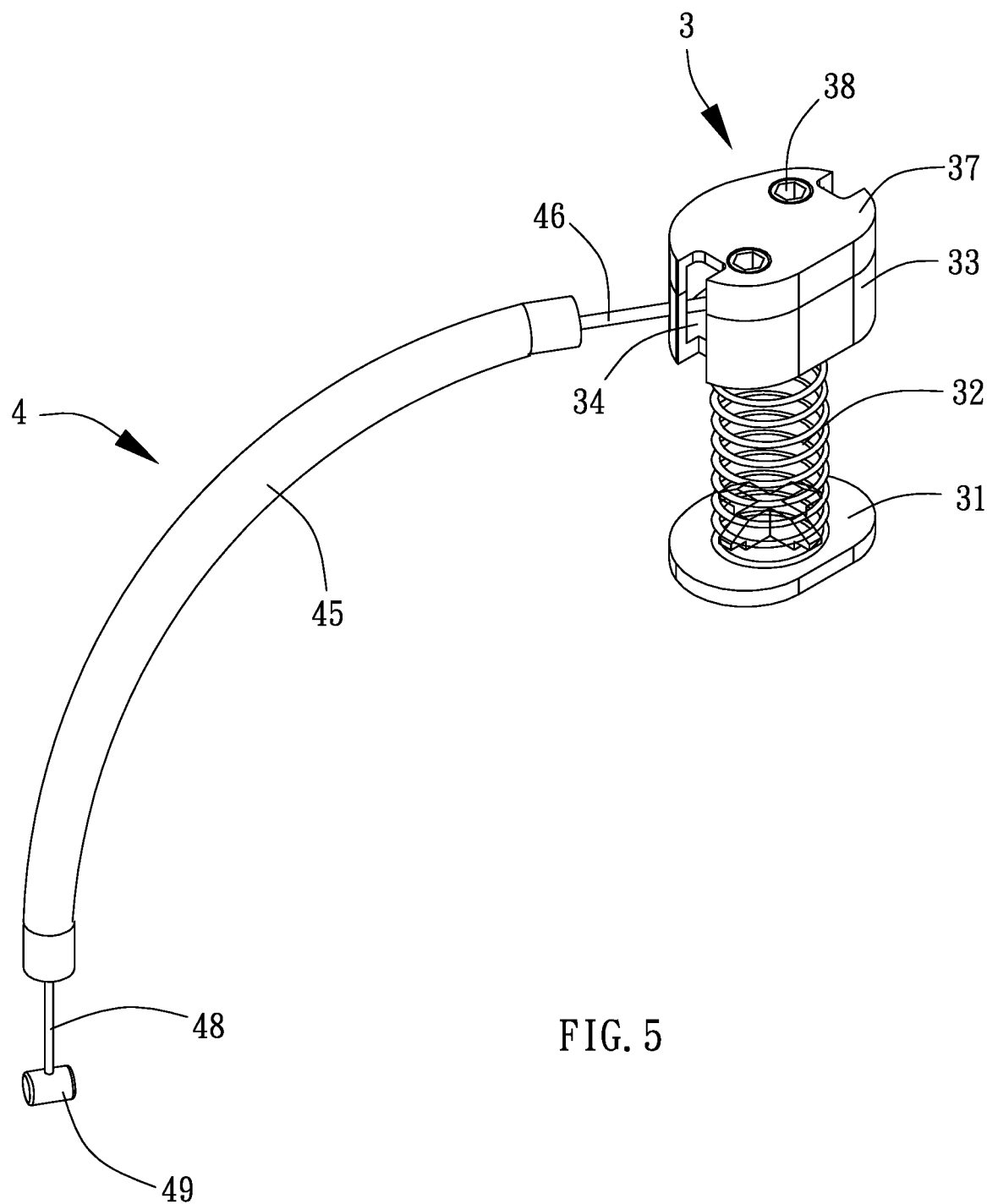
FIG. 5 is a partial perspective view of the luggage in accordance with the preferred embodiment of the present invention.
Figure 7:
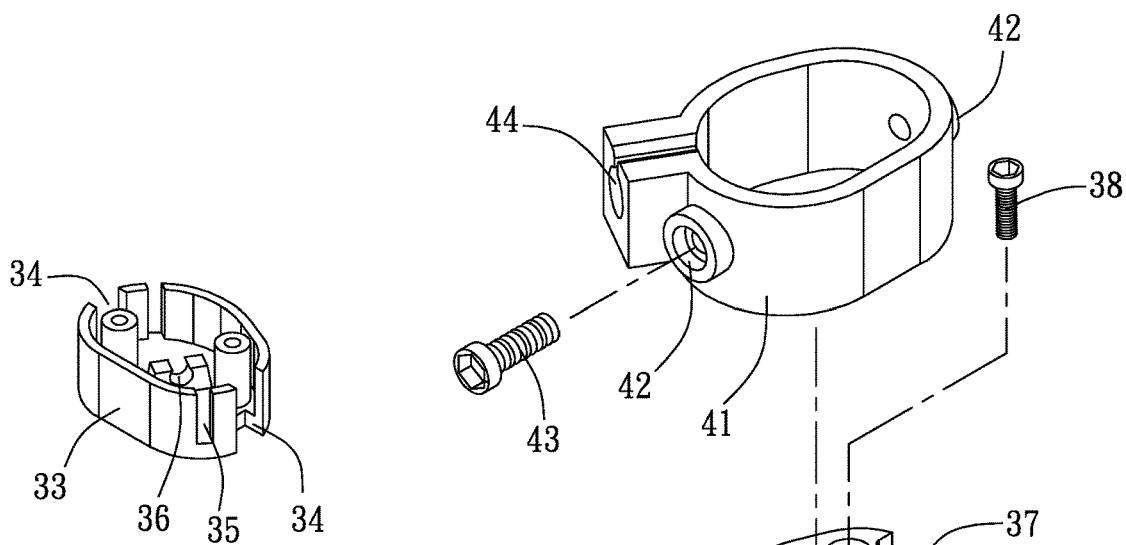
FIG. 7 is a perspective view of a control box of the luggage in accordance with the preferred embodiment of the present invention.
Figure 6:
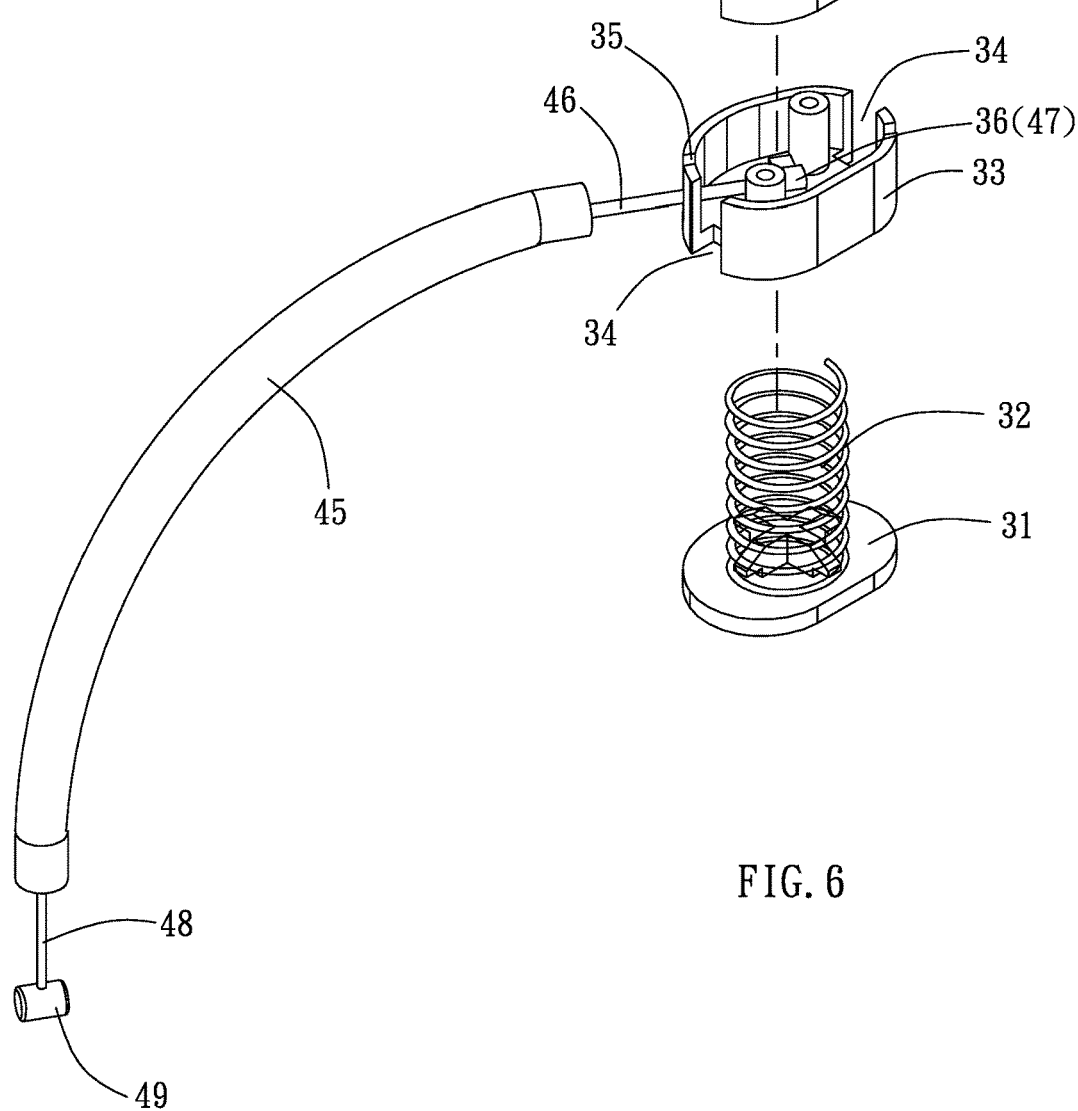
FIG. 6 is a partial exploded perspective view of the luggage as shown in FIG. 5.
Figure 8:
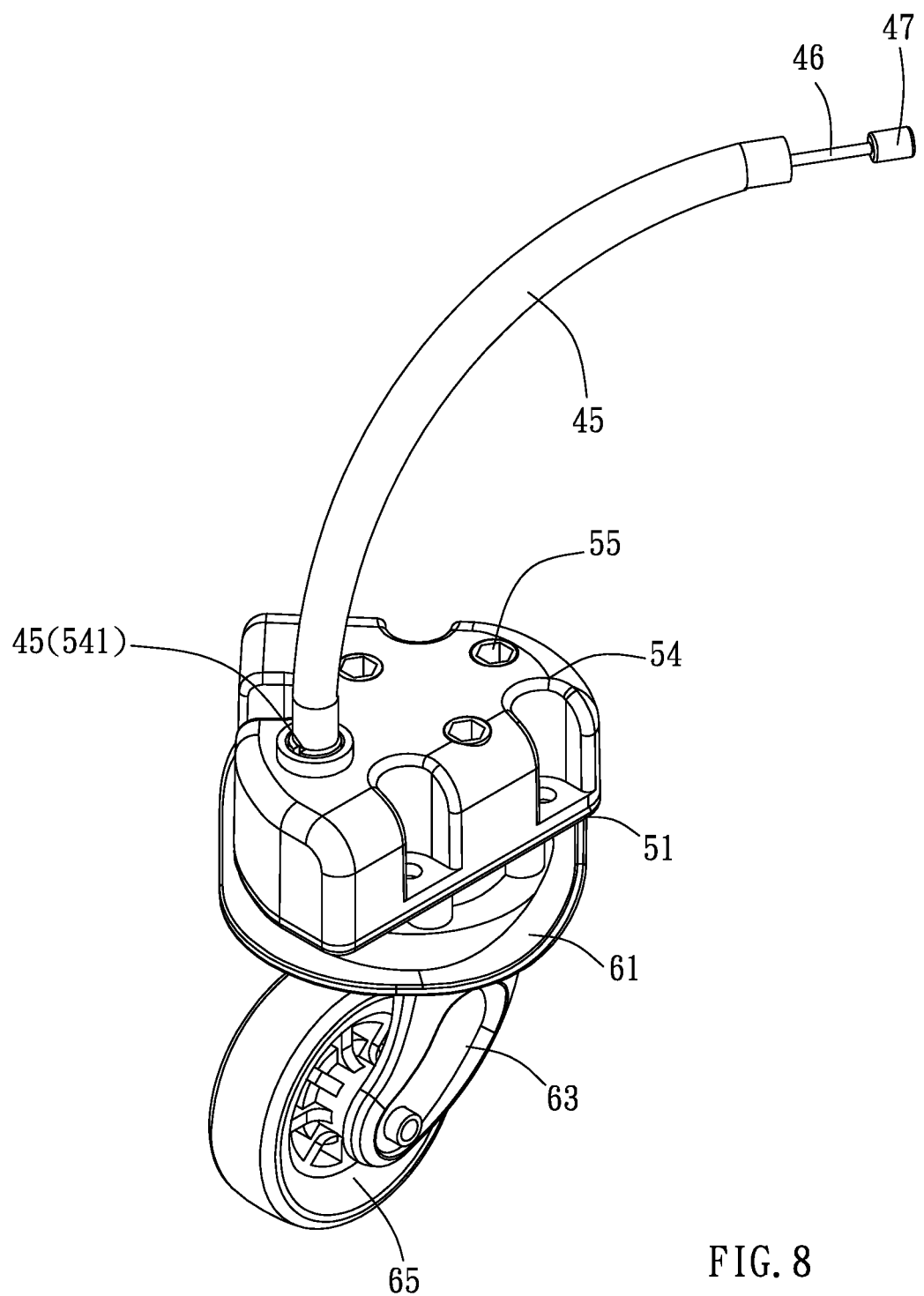
FIG. 8 is a partial perspective view of the luggage in accordance with the preferred embodiment of the present invention.
Figure 9:
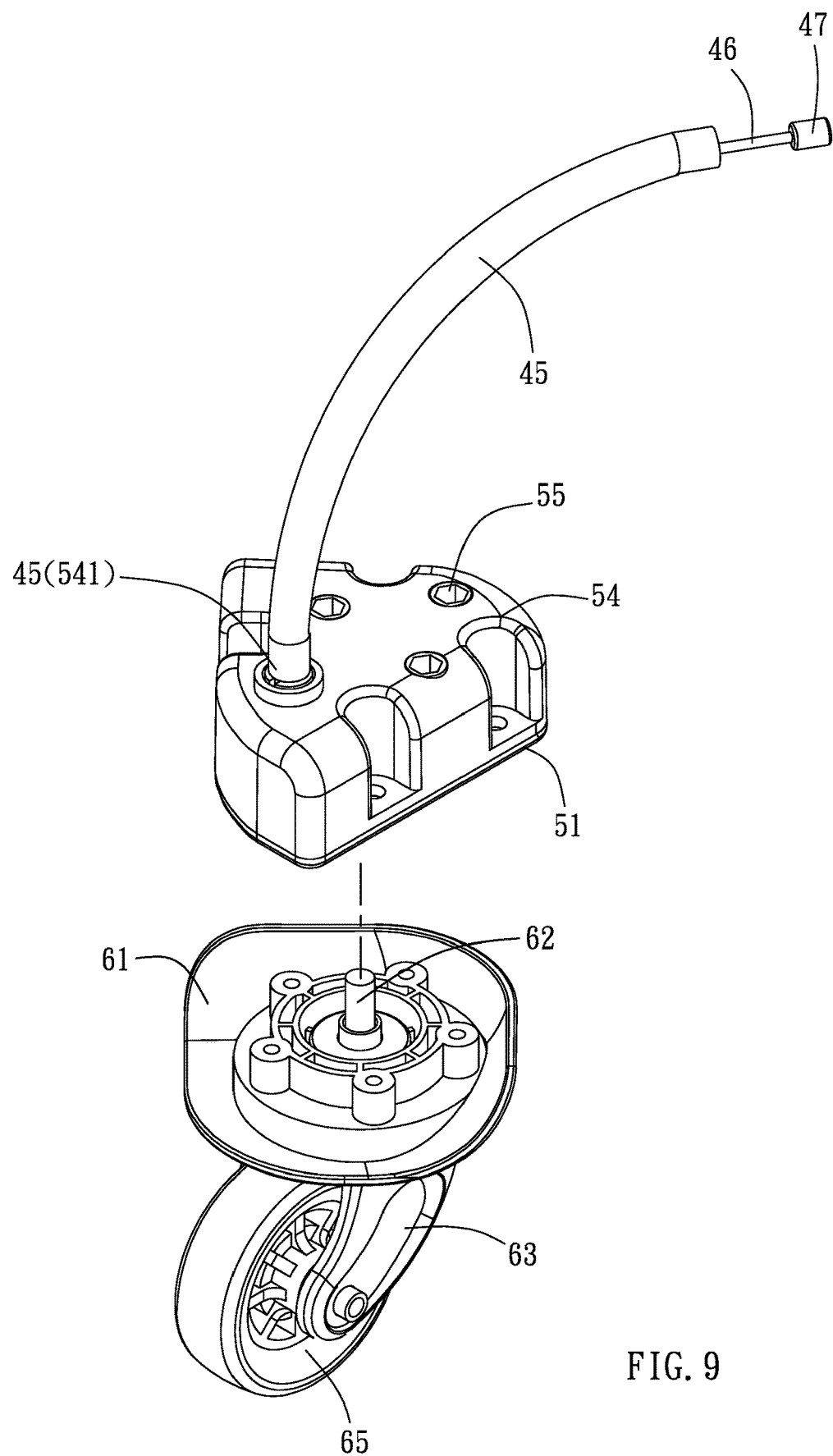
FIG. 9 is a partial exploded perspective view of the luggage as shown in FIG. 8.
Figure 10:
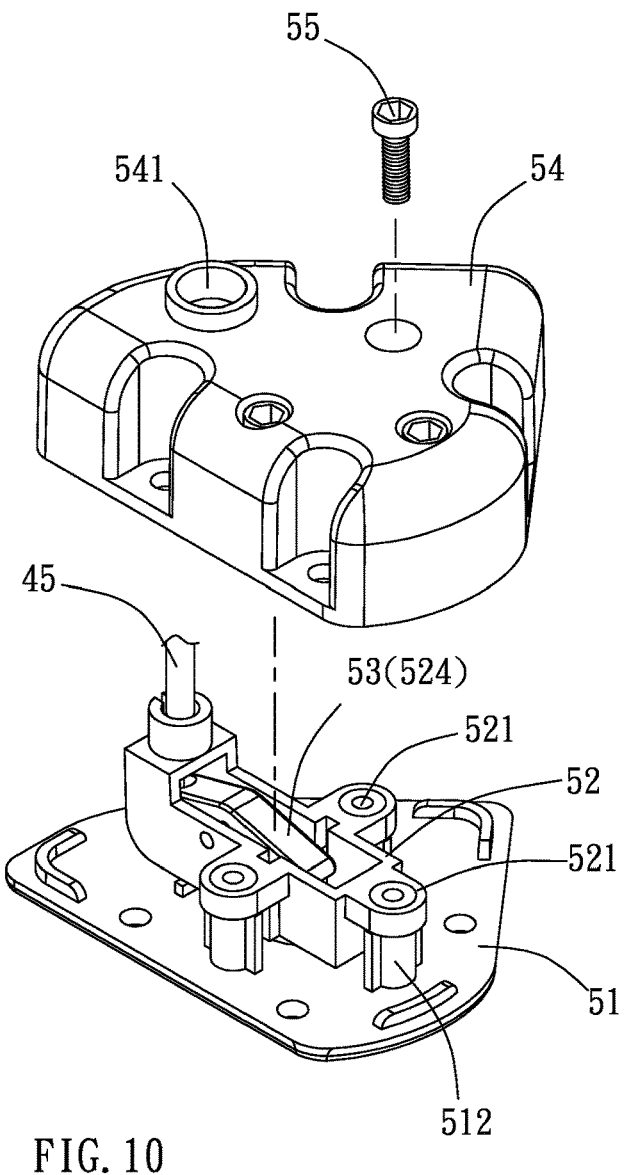
FIG. 10 is a partial exploded perspective view of a transmission unit of the luggage in accordance with the preferred embodiment of the present invention.
Figure 11:
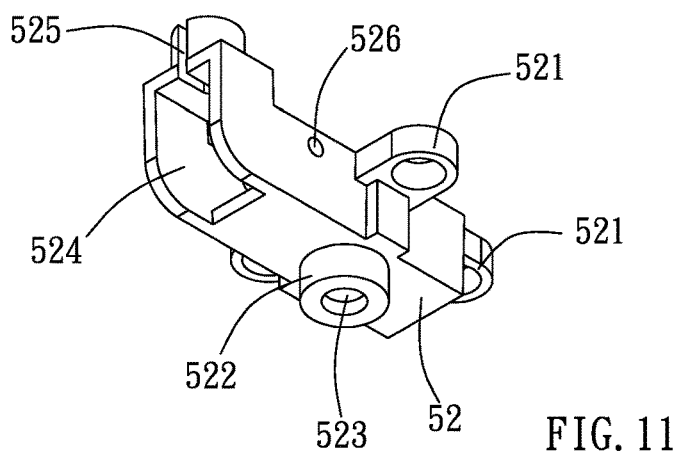
FIG. 11 is a perspective view of a support seat of the luggage in accordance with the preferred embodiment of the present invention.
Figure 12:
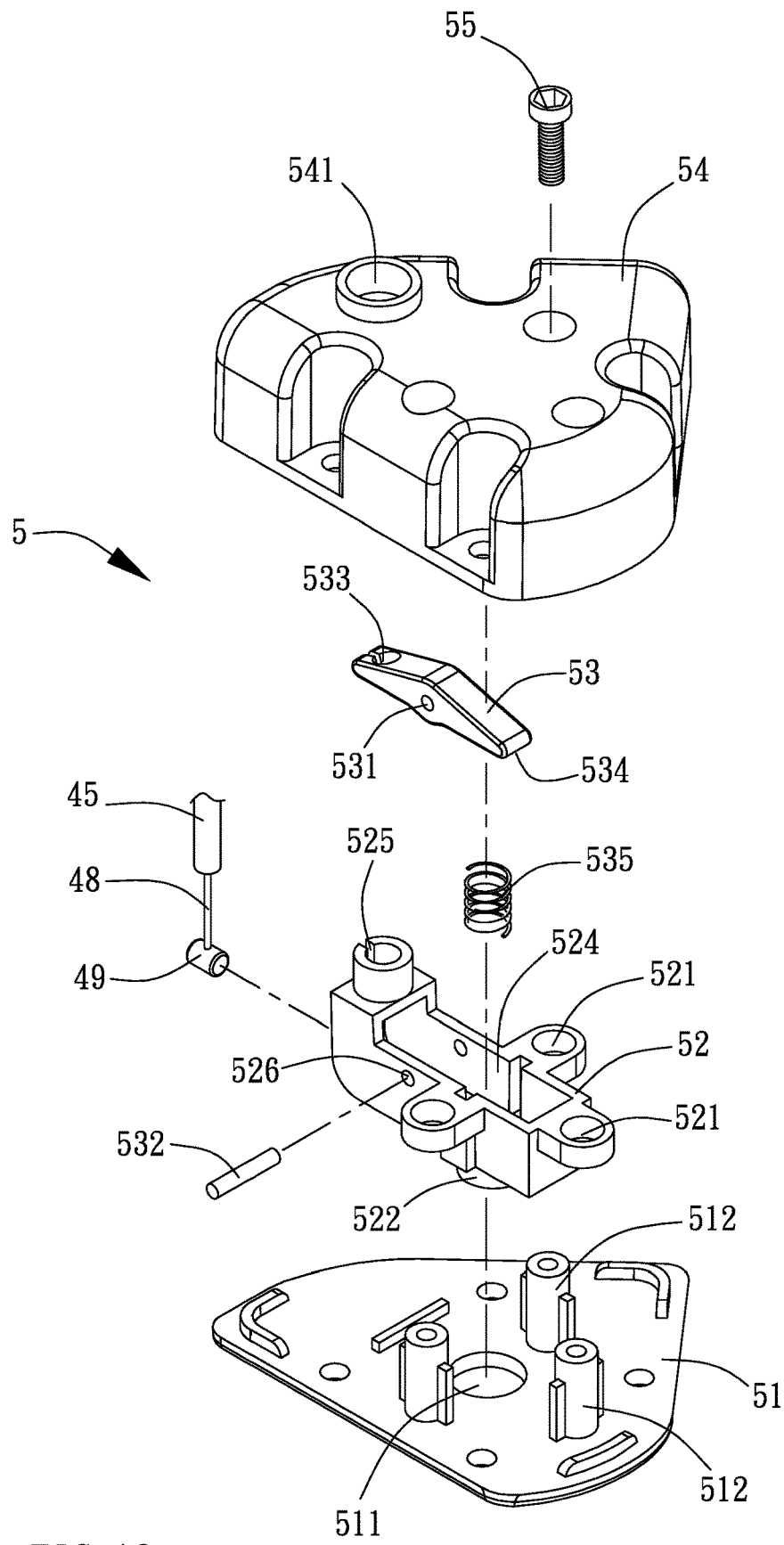
FIG. 12 is an exploded perspective view of the transmission unit of the luggage in accordance with the preferred embodiment of the present invention.
Figure 13:
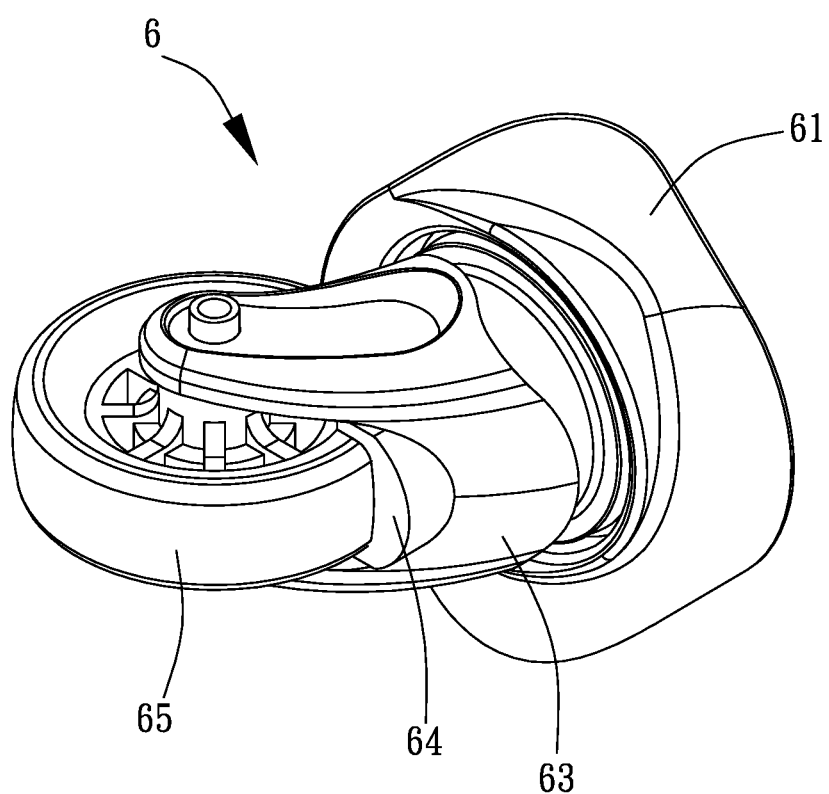
FIG. 13 is a perspective view of a wheel unit of the luggage in accordance with the preferred embodiment of the present invention.
Figure 14:
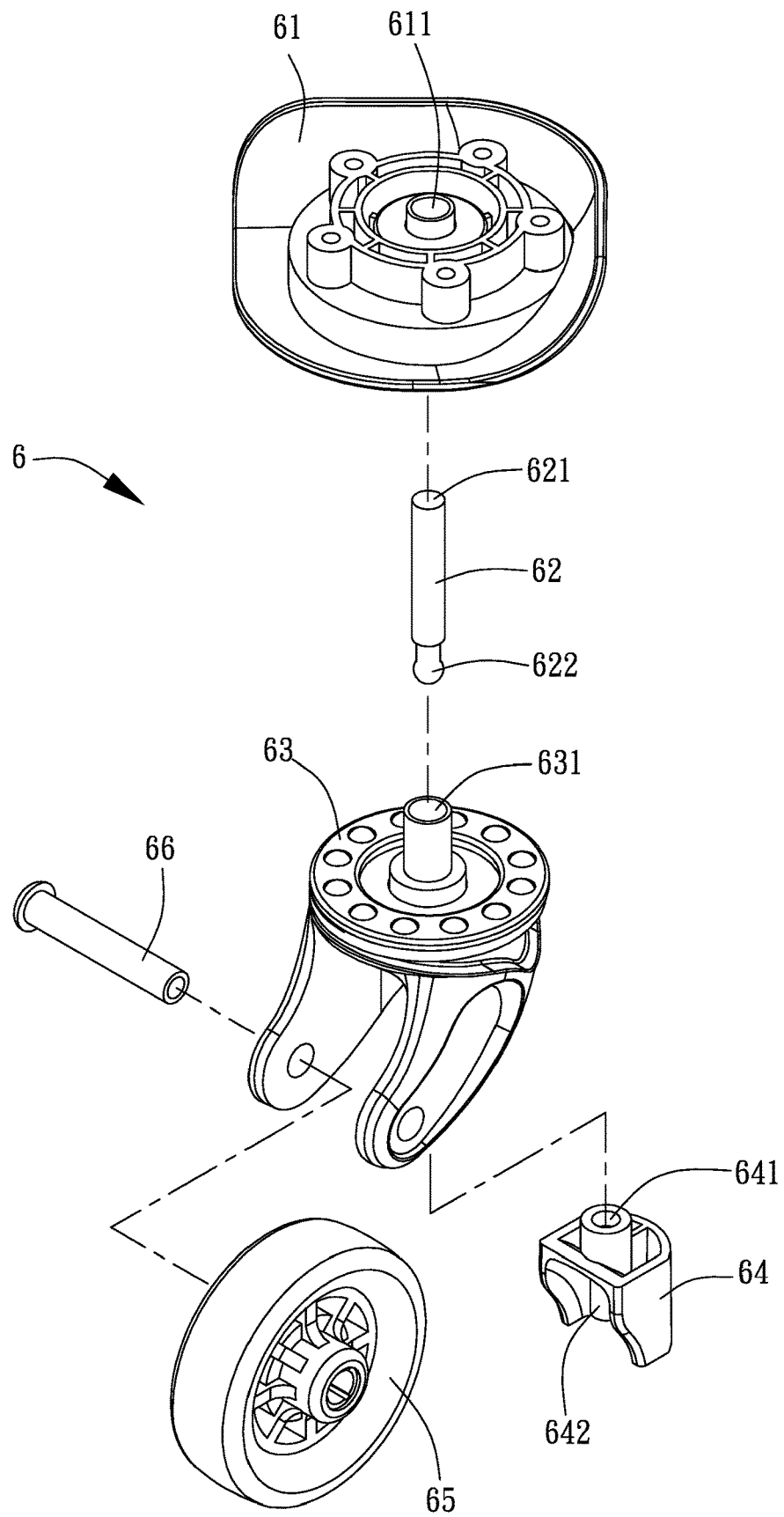
FIG. 14 is an exploded perspective view of the wheel unit of the luggage in accordance with the preferred embodiment of the present invention.

Referring to the drawings and initially to FIGS. 2-14, a luggage in accordance with the preferred embodiment of the present invention comprises a pull handle unit 2, a pressing unit 3 mounted in the pull handle unit 2, a driving unit 4 connected with the pressing unit 3, a transmission unit 5 connected with the driving unit 4, and a wheel unit 6 connected with the transmission unit 5.

The pull handle unit 2 includes an outer pipe 21 and an inner pipe 22 movably mounted in the outer pipe 21.

The pressing unit 3 includes a spring support 31 secured in the outer pipe 21, a control box 33 movably mounted in the outer pipe 21, and a first compression spring 32 biased between the spring support 31 and the control box 33.

The driving unit 4 includes a fixed seat 41 secured on the outer pipe 21, and a drive member 45 mounted on the fixed seat 41. The fixed seat 41 is provided with a mounting groove 44. The drive member 45 has a first neck 46 and a second neck 48. The first neck 46 of the drive member 45 is mounted in the mounting groove 44 of the fixed seat 41. The first neck 46 has a first driving portion 47 secured to the control box 33. The second neck 48 has a second driving portion 49.

The transmission unit 5 includes a bottom plate 51, a support seat 52 mounted on the bottom plate 51 and provided with a receiving chamber 524, a transmission member 53 mounted in the receiving chamber 524 of the support seat 52, and having a first end driven by the second driving portion 49 of the drive member 45, and a second end provided with a pressing portion 534, a second compression spring 535 biased between the support seat 52 and the pressing portion 534 of the transmission member 53, and a top cover 54 mounted on the bottom plate 51 and covering the support seat 52. The bottom plate 51 is mounted in a luggage body and secured on the bottom of the luggage body. The receiving chamber 524 of the support seat 52 has a side provided with a limit breach 525, and the second neck 48 of the drive member 45 is mounted in the limit breach 525 of the support seat 52. The top cover 54 is provided with a through hole 541, and the drive member 45 passes the through hole 541 of the top cover 54.

The wheel unit 6 includes a base 61 secured to the bottom plate 51 by riveting, a wheel support 63 pivotally mounted on the base 61, a wheel 65 mounted on the wheel support 63, a drive shaft 62 movably mounted on the base 61, and having an upper end 621 abutting and driven by the pressing portion 534 of the transmission member 53, and a brake member 64 mounted on a lower end 622 of the drive shaft 62, and provided with a braking rim 642 that is movable to press the wheel 65. The base 61 is located outside of the luggage body and secured on the bottom of the luggage body. The base 61 is provided with a shaft hole 611. The drive shaft 62 extends through the shaft hole 611 of the base 61. The second compression spring 535 is mounted on the upper end 621 of the drive shaft 62. The wheel support 63 is provided with a shaft hole 631. The brake member 64 is provided with a shaft hole 641. The lower end 622 of the drive shaft 62 extends through the shaft hole 631 of the wheel support 63 and the shaft hole 641 of the brake member 64, such that the brake member 64 is pivotally mounted on the drive shaft 62. The wheel 65 is pivotally mounted on the wheel support 63 by a shaft 66.

In the preferred embodiment of the present invention, the outer pipe 21 has a lower end provided with an elongate slit 23 extending upward, and the first neck 46 of the drive member 45 is inserted into the elongate slit 23 of the outer pipe 21.

In the preferred embodiment of the present invention, the outer pipe 21 is provided with a screw hole 24, the fixed seat 41 is provided with a through hole 42, and the driving unit 4 further includes a screw member 43 extending through the through hole 42 of the fixed seat 41, and screwed into the screw hole 24 of the outer pipe 21. The control box 33 is provided with a limit slot 34, and the screw member 43 has an end extending into the limit slot 34 of the control box 33, such that the control box 33 is limited by the screw member 43. The control box 33 is provided with a mounting recess 35, and the first neck 46 of the drive member 45 is mounted in the mounting recess 35 of the control box 33. The control box 33 is provided with a limit seat 36, and the first driving portion 47 of the drive member 45 is positioned on the limit seat 36 of the control box 33.

In the preferred embodiment of the present invention, the bottom plate 51 is provided with a plurality of positioning posts 512, and the support seat 52 is provided with a plurality of mounting holes 521 mounted on the positioning posts 512. The positioning posts 512 surround the support seat 52. The bottom plate 51 is provided with a receiving hole 511, and the support seat 52 is provided with a stub 522 mounted in the receiving hole 511 of the bottom plate 51.

In the preferred embodiment of the present invention, the support seat 52 is provided with a shaft hole 526 connected to the receiving chamber 524, the transmission member 53 is provided with a central hole 531, and the transmission unit 5 further includes a shaft 532 extending through the shaft hole 526 of the support seat 52 and the central hole 531 of the transmission member 53, so that the transmission member 53 is pivotally mounted in the receiving chamber 524 of the support seat 52 and is pivotable about the central hole 531.

In the preferred embodiment of the present invention, the transmission unit 5 further includes a threaded member 55 extending through the top cover 54 and the bottom plate 51 to secure the top cover 54 to the bottom plate 51.

In the preferred embodiment of the present invention, the lower end 622 of the drive shaft 62 has a spherical shape.

In the preferred embodiment of the present invention, the braking rim 642 of the brake member 64 has a shape corresponding to that a rim of the wheel 65.

In the preferred embodiment of the present invention, the pressing unit 3 further includes an upper cap 37 mounted on the control box 33, and a screw element 38 extending through the upper cap 37 and the control box 33 to secure the upper cap 37 to the control box 33.

In the preferred embodiment of the present invention, the first end of the transmission member 53 is provided with a limit opening 533, and the second neck 48 of the drive member 45 is mounted in the limit opening 533 of the transmission member 53, with the second driving portion 49 of the drive member 45 abutting the bottom of the limit opening 533.

In the preferred embodiment of the present invention, the stub 522 of the support seat 52 is provided with a mounting hole (or shaft hole) 523, and the second compression spring 535 is mounted in the mounting hole 523 of the stub 522. The upper end 621 of the drive shaft 62 in turn extends through the mounting hole 523 of the stub 522 and the second compression spring 535.

In assembly, the first neck 46 of the drive member 45 is mounted in the mounting recess 35 of the control box 33, and the first driving portion 47 of the drive member 45 is mounted on the limit seat 36 of the control box 33. Then, the upper cap 37 is mounted on the control box 33, such that the first driving portion 47 of the drive member 45 is secured in the control box 33. Then, the control box 33, the first compression spring 32 and the spring support 31 are inserted into the outer pipe 21 from the lower end thereof, while the first neck 46 of the drive member 45 is inserted into the elongate slit 23 of the outer pipe 21. Then, the spring support 31 is riveted to the outer pipe 21. Then, the fixed seat 41 is mounted on the outer pipe 21 from the lower end thereof, with the first neck 46 of the drive member 45 being mounted in the mounting groove 44 of the fixed seat 41. Then, the screw member 43 extends through the through hole 42 of the fixed seat 41, and is screwed into the screw hole 24 of the outer pipe 21, such that the fixed seat 41 is screwed onto the outer pipe 21. At this time, the screw member 43 has an end extending into the limit slot 34 of the control box 33, such that the control box 33 is limited by the screw member 43 and is moved between the screw member 43 and the spring support 31. Then, the drive member 45 passes the through hole 541 of the top cover 54, with the second neck 48 of the drive member 45 in turn extending through the limit breach 525 of the support seat 52 and the limit opening 533 of the transmission member 53, and with the second driving portion 49 of the drive member 45 abutting the bottom of the limit opening 533. Then, the second compression spring 535 is mounted in the mounting hole 523 of the stub 522. Then, the transmission member 53 is mounted in the receiving chamber 524 of the support seat 52, with the pressing portion 534 of the transmission member 53 abutting and pressing the second compression spring 535. Then, the shaft 532 passes through the shaft hole 526 of the support seat 52 and the central hole 531 of the transmission member 53, so that the transmission member 53 is pivotally mounted in the receiving chamber 524 of the support seat 52. Then, the mounting holes 521 of the support seat 52 is mounted on the positioning posts 512 of the bottom plate 51, and the stub 522 of the support seat 52 is mounted in the receiving hole 511 of the bottom plate 51. Then, the threaded member 55 extends through the top cover 54 and the bottom plate 51 to secure the top cover 54 to the bottom plate 51, and to fix the support seat 52. Then, the wheel 65 is pivotally mounted on the wheel support 63 by the shaft 66. Then, the wheel support 63 is pivotally mounted on the base 61. Then, the drive shaft 62 extends through the shaft hole 611 of the base 61 and the shaft hole 631 of the wheel support 63, with the lower end 622 of the drive shaft 62 extending into the shaft hole 641 of the brake member 64, such that the brake member 64 is pivotally mounted on the drive shaft 62. Then, the bottom plate 51 of the transmission unit 5 is mounted in the luggage body and placed on the bottom of the luggage body, and the base 61 of the wheel unit 6 is located outside of the luggage body and placed on the bottom of the luggage body. Finally, the bottom plate 51 of the transmission unit 5 and the base 61 of the wheel unit 6 are riveted and affixed to the luggage body. At this time, the upper end 621 of the drive shaft 62 in turn extends through the mounting hole 523 of the stub 522 and the second compression spring 535, while the pressing portion 534 of the transmission member 53 abuts and presses the upper end 621 of the drive shaft 62.

Figure 15:
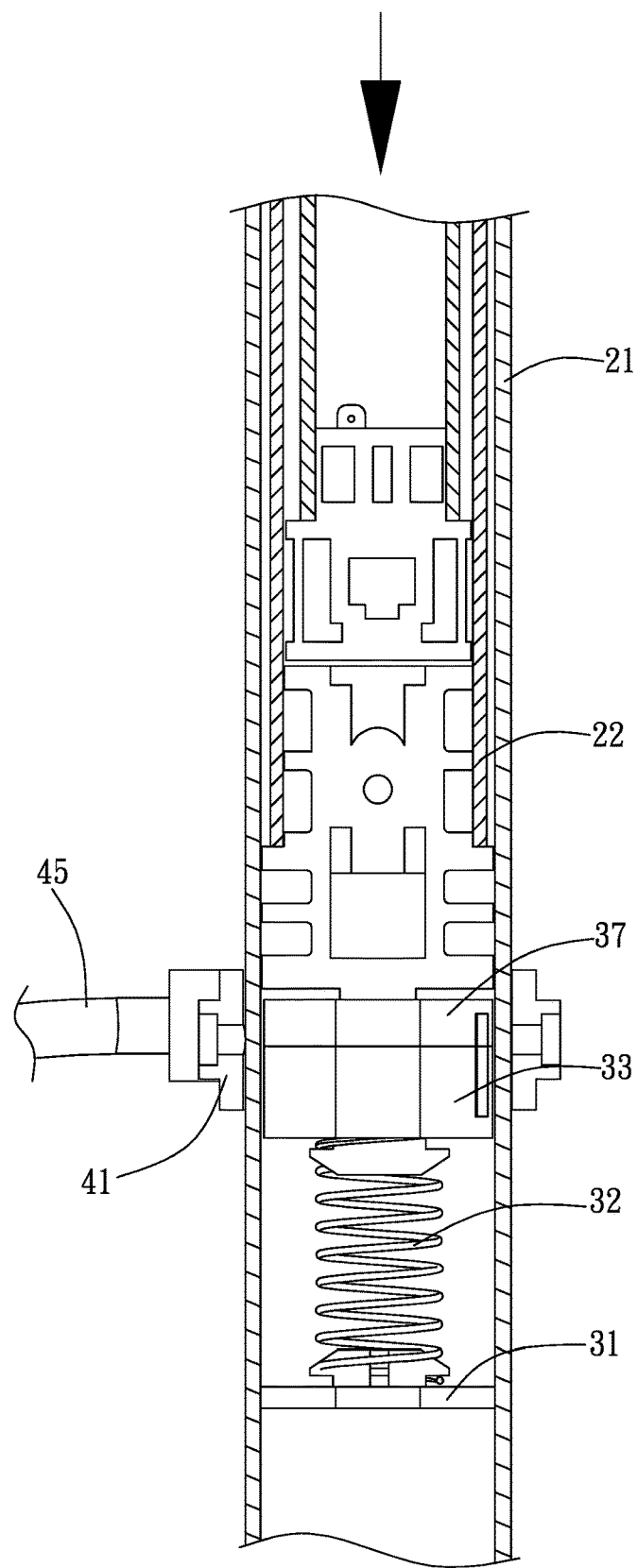
FIG. 15 is a partial cross-sectional operational view of the luggage in accordance with the preferred embodiment of the present invention.
Figure 16:
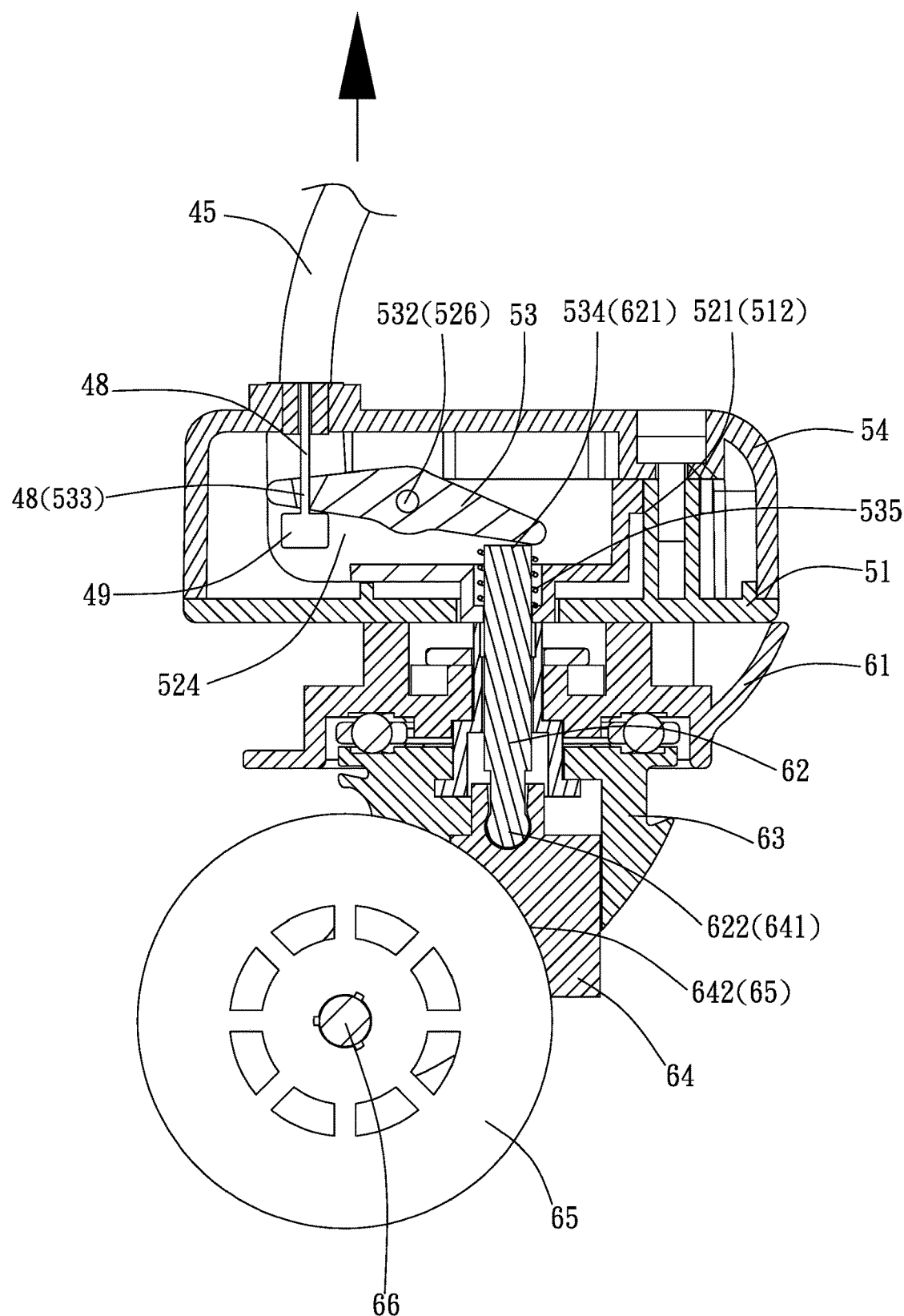
FIG. 16 is another partial cross-sectional operational view of the luggage in accordance with the preferred embodiment of the present invention.

In operation, referring to FIGS. 15 and 16 with reference to FIGS. 2-14, when the inner pipe 22 is moved downward in the outer pipe 21 to a predetermined position, the lower end of the inner pipe 22 presses the pressing unit 3, such that the control box 33 of the pressing unit 3 and the first driving portion 47 of the drive member 45 are moved downward as shown in FIG. 15. At this time, the first compression spring 32 is pressed by the control box 33 of the pressing unit 3 to store a restoring force. When the first driving portion 47 of the drive member 45 is moved downward, the second driving portion 49 of the drive member 45 is forced in the opposite direction and is moved upward. When the second driving portion 49 of the drive member 45 is moved upward, the first end of the transmission member 53 is moved upward, such that the transmission member 53 is pivoted, and the pressing portion 534 of the transmission member 53 is moved downward to move the drive shaft 62 downward. At this time, the second compression spring 535 is pressed by the pressing portion 534 of the transmission member 53 to store a restoring force. When the drive shaft 62 is moved downward, the brake member 64 is moved downward, such that the braking rim 642 of the brake member 64 is moved to press and brake the wheel 65 as shown in FIG. 16, so as to stop and prevent movement of the wheel 65 when not in use. At this time, the lower end 622 of the drive shaft 62 has a spherical shape, such that the brake member 64 is adjusted to fit the wheel 65 exactly and closely, thereby achieving the optimum braking effect.

Figure 17:
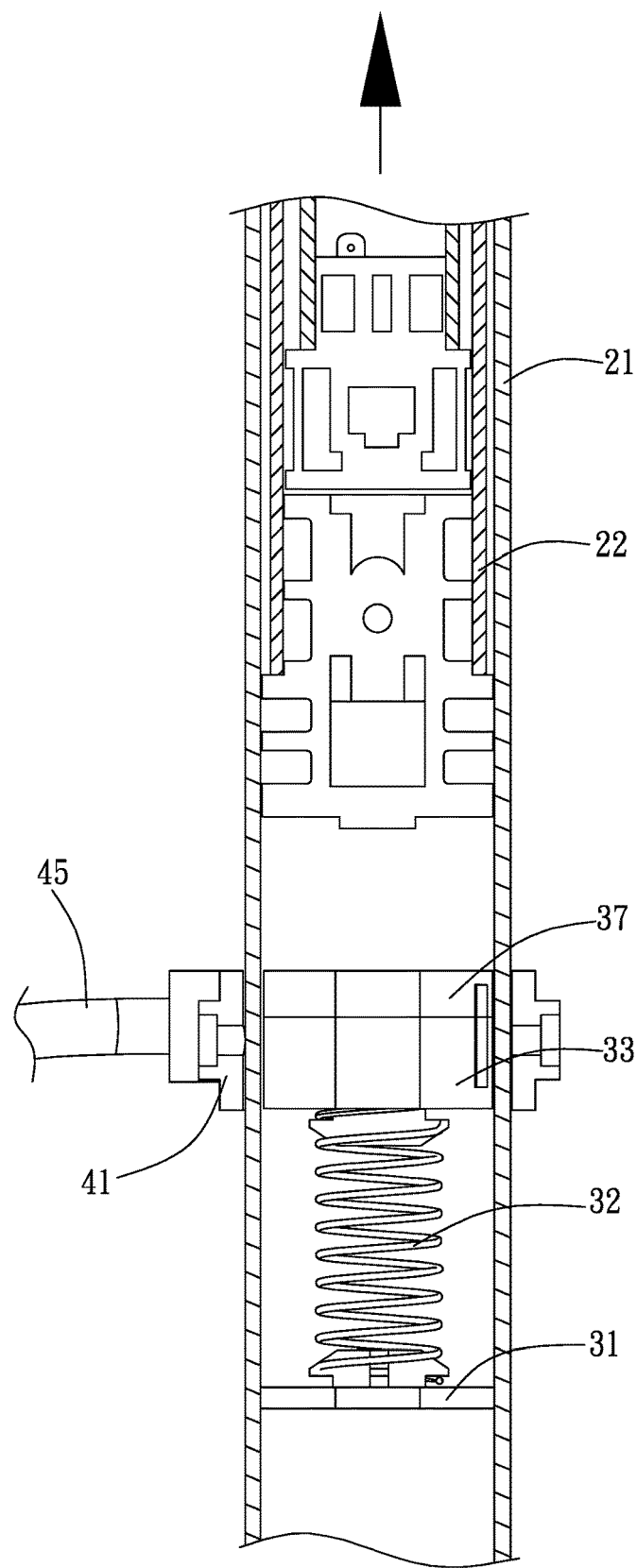
FIG. 17 is a schematic operational view of the luggage as shown in FIG. 15.
Figure 18:
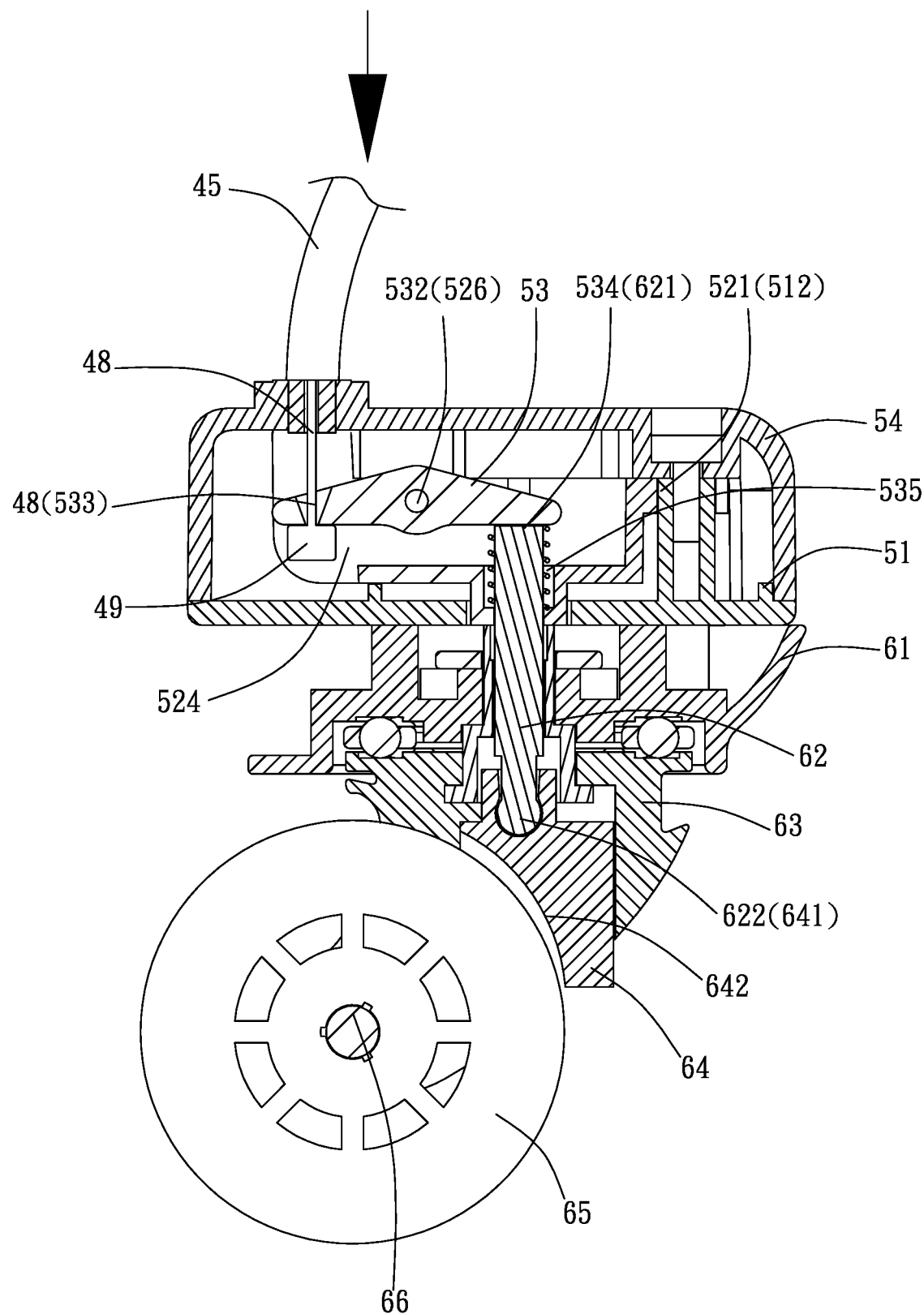
FIG. 18 is a schematic operational view of the luggage as shown in FIG. 16.

On the contrary, referring to FIGS. 17 and 18 with reference to FIGS. 2-16, when the inner pipe 22 is moved upward in the outer pipe 21, the pressing unit 3 is released from the inner pipe 22, such that the control box 33 of the pressing unit 3 is pushed by the restoring force of the first compression spring 32 and is returned to the original position as shown in FIG. 17, while the first driving portion 47 of the drive member 45 is driven by the pressing unit 3 and is returned to the original position. At the same time, the first end of the transmission member 53 is released from the second driving portion 49 of the drive member 45, and the pressing portion 534 of the transmission member 53 is pushed by the restoring force of the second compression spring 535 and moved upward, such that the drive shaft 62 is driven upward by the second compression spring 535. When the drive shaft 62 is moved upward, the brake member 64 is moved upward, such that the braking rim 642 of the brake member 64 is moved to detach from the wheel 65 as shown in FIG. 18, so as to unlock the wheel 65. Thus, the wheel 65 is moved freely, thereby facilitating the user dragging the luggage.

Accordingly, when the inner pipe 22 is moved downward in the outer pipe 21, the wheel 65 is braked and cannot be moved anymore, and when the inner pipe 22 is moved upward in the outer pipe 21, the wheel 65 is unlocked and is moved freely. In addition, the user only needs to manipulate the pull handle unit 2 to brake or unlock the wheel 65, so that the wheel 65 is braked and unlocked easily and conveniently.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. A luggage comprising:
a pull handle unit;

a pressing unit mounted in the pull handle unit;
a driving unit connected with the pressing unit;
a transmission unit connected with the driving unit; and
a wheel unit connected with the transmission unit;
wherein:
the pull handle unit includes an outer pipe and an inner pipe movably mounted in the outer pipe;
the pressing unit includes a spring support secured in the outer pipe, a control box movably mounted in the outer pipe, and a first compression spring biased between the spring support and the control box;
the driving unit includes a fixed seat secured on the outer pipe, and a drive member mounted on the fixed seat;
the fixed seat is provided with a mounting groove;
the drive member has a first neck and a second neck;
the first neck of the drive member is mounted in the mounting groove of the fixed seat;
the first neck has a first driving portion secured to the control box;
the second neck has a second driving portion;
the transmission unit includes a bottom plate, a support seat mounted on the bottom plate and provided with a receiving chamber, a transmission member mounted in the receiving chamber of the support seat, and having a first end driven by the second driving portion of the drive member, and a second end provided with a pressing portion, a second compression spring biased between the support seat and the pressing portion of the transmission member, and a top cover mounted on the bottom plate and covering the support seat;
the bottom plate is mounted in a luggage body and secured on a bottom of the luggage body;
the receiving chamber of the support seat has a side provided with a limit breach;
the second neck of the drive member is mounted in the limit breach of the support seat;
the top cover is provided with a through hole;
the drive member passes the through hole of the top cover;
the wheel unit includes a base secured to the bottom plate, a wheel support pivotally mounted on the base, a wheel mounted on the wheel support, a drive shaft movably mounted on the base, and having an upper end driven by the pressing portion of the transmission member, and a brake member mounted on a lower end of the drive shaft, and provided with a braking rim that is movable to press the wheel;
the base is located outside of the luggage body and secured on the bottom of the luggage body;
the base is provided with a shaft hole;
the drive shaft extends through the shaft hole of the base;
the second compression spring is mounted on the upper end of the drive shaft;
the wheel support is provided with a shaft hole;
the brake member is provided with a shaft hole; and
the lower end of the drive shaft extends through the shaft hole of the to wheel support and the shaft hole of the brake member, such that the brake member is pivotally mounted on the drive shaft.

2. The luggage of claim 1, wherein the outer pipe has a lower end provided with an elongate slit extending upward, and the first neck of the drive member is inserted into the elongate slit of the outer pipe.

3. The luggage of claim 1, wherein:
the outer pipe is provided with a screw hole;
the fixed seat is provided with a through hole;
the driving unit further includes a screw member extending through the through hole of the fixed seat, and screwed into the screw hole of the outer pipe;
the control box is provided with a limit slot;
the screw member has an end extending into the limit slot of the control box;
the control box is provided with a mounting recess;
the first neck of the drive member is mounted in the mounting recess of the control box;
the control box is provided with a limit seat; and
the first driving portion of the drive member is positioned on the limit seat of the control box.

4. The luggage of claim 1, wherein:
the bottom plate is provided with a plurality of positioning posts;
the support seat is provided with a plurality of mounting holes mounted on the positioning posts;
the bottom plate is provided with a receiving hole; and
the support seat is provided with a stub mounted in the receiving hole of the bottom plate.

5. The luggage of claim 1, wherein the support seat is provided with a shaft hole connected to the receiving chamber, the transmission member is provided with a central hole, and the transmission unit further includes a shaft extending through the shaft hole of the support seat and the central hole of the transmission member, so that the transmission member is pivotally mounted in the receiving chamber of the support seat and is pivotable about the central hole.

6. The luggage of claim 1, wherein the transmission unit further includes a threaded member extending through the top cover and the bottom plate to secure the top cover to the bottom plate.

7. The luggage of claim 1, wherein the lower end of the drive shaft has a spherical shape.

8. The luggage of claim 1, wherein the braking rim of the brake member has a shape corresponding to that a rim of the wheel.

9. The luggage of claim 1, wherein the pressing unit further includes an upper cap mounted on the control box, and a screw element extending through the upper cap and the control box to secure the upper cap to the control box.

10. The luggage of claim 1, wherein the first end of the transmission member is provided with a limit opening, and the second neck of the drive member is mounted in the limit opening of the transmission member, with the second driving portion of the drive member abutting the bottom of the limit opening.

* * * * *